United States Patent
Ahn

(10) Patent No.: US 8,936,863 B2
(45) Date of Patent: Jan. 20, 2015

(54) SECONDARY BATTERY

(75) Inventor: Chang-Bum Ahn, Yongin-si (KR)

(73) Assignee: Samsung SDI Co., Ltd., Yongin-si, Gyeonggi-do (KR)

( * ) Notice: Subject to any disclaimer, the term of this patent is extended or adjusted under 35 U.S.C. 154(b) by 200 days.

(21) Appl. No.: 13/485,648

(22) Filed: May 31, 2012

(65) Prior Publication Data

US 2013/0017424 A1    Jan. 17, 2013

Related U.S. Application Data

(60) Provisional application No. 61/507,080, filed on Jul. 12, 2011.

(51) Int. Cl.

| H01M 2/02 | (2006.01) |
|---|---|
| H01M 2/16 | (2006.01) |
| H01M 4/00 | (2006.01) |
| H01M 10/02 | (2006.01) |
| H01M 10/04 | (2006.01) |
| H01M 10/058 | (2010.01) |
| H01M 10/42 | (2006.01) |

(52) U.S. Cl.
CPC .......... H01M 2/1673 (2013.01); H01M 2/1646 (2013.01); H01M 10/02 (2013.01); H01M 10/0431 (2013.01); H01M 10/058 (2013.01); H01M 10/4235 (2013.01)
USPC .............................. 429/94; 429/163; 429/144

(58) Field of Classification Search
None
See application file for complete search history.

(56) References Cited

U.S. PATENT DOCUMENTS

2008/0292966 A1    11/2008    Bak et al.

FOREIGN PATENT DOCUMENTS

| EP | 1 998 401 A2 | 12/2008 | |
|---|---|---|---|
| EP | 2 048 734 A1 | 4/2009 | |
| EP | 2048734 | * 4/2009 | ............ H01M 10/02 |
| EP | 2 325 925 A1 | 5/2011 | |
| JP | 2001-093521 A | 4/2001 | |
| JP | 3700150 B2 | 7/2005 | |
| KR | 10-2006-0094765 A | 8/2006 | |
| KR | 10-2008-0103847 A | 11/2008 | |

OTHER PUBLICATIONS

Extended European Search Report dated Oct. 16, 2012 for European Patent Application No. EP 12 173 687.0 which claims priority from U.S. Appl. No. 61/507,080, filed Jul. 12, 2011, and captioned U.S. Appl. No. 13/485,648.

* cited by examiner

*Primary Examiner* — Barbara Gilliam
*Assistant Examiner* — Angela Martin
(74) *Attorney, Agent, or Firm* — Knobbe Martens Olson & Bear LLP

(57) ABSTRACT

A secondary battery comprises: an electrode assembly comprising a first plate, a second plate, and a separator disposed between the first and second plates, wherein the first plate comprises an active portion and a non-active portion extending from the active portion, wherein the second plate comprises an active portion and a non-active portion extending from the active portion; a ceramic material disposed on the non-active portion of the first plate; and a battery case housing the electrode assembly.

14 Claims, 4 Drawing Sheets

SECONDARY BATTERY

RELATED APPLICATIONS

This application claims priority to and the benefit of U.S. Provisional Application No. 61/507,080, filed on Jul. 12, 2011, with the United States Patent and Trademark Office, the entire content of which is incorporated herein by reference.

BACKGROUND

1. Field

Embodiments of the invention relate to a secondary battery, and more particularly, to a secondary battery having improved safety.

2. Description of the Related Technology

Recently, secondary batteries have been widely used for power supply of portable electronic equipment.

Further, as portable electronic equipment are more increasingly used in various fields, there is a rapidly increasing demand for secondary batteries with high capacity. Accordingly, extensive studies are being conducted to improve the safety of secondary batteries.

SUMMARY

An aspect of the present invention is to provide a secondary battery which inhibits short circuiting between a positive plate and a negative plate.

Another aspect of the present invention is to provide a secondary battery which is stably used at high temperatures.

Still another aspect of the present invention is to provide a secondary battery in which a positive plate and a negative plate are easily aligned.

According to an aspect of the present invention, a secondary battery comprises: an electrode assembly comprising a first plate, a second plate, and a separator disposed between the first and second plates, wherein the first plate comprises an active portion and a non-active portion extending from the active portion, wherein the second plate comprises an active portion and a non-active portion extending from the active portion; a ceramic material disposed on the non-active portion of the first plate; and a battery case housing the electrode assembly.

According to an embodiment, the ceramic material faces the active portion of the second plate. The ceramic material may be adjacent to the active portion of the first plate. The ceramic material may be disposed adjacent to an interface between the active portion and the non-active portion of the first plate.

According to an embodiment, the first plate is formed by coating a first active material on at least one of a first surface of a substrate and on an opposing second surface of the substrate, wherein the active portion of the first plate is defined by a portion of the substrate that is coated and the non-active portion of the first plate is defined by a portion of the substrate that is not coated, and wherein the ceramic material is formed on at least one of the first and second surfaces of the substrate at the non-active portion.

According to an embodiment, the first plate is formed by coating a first active material on the first and second surfaces of the first substrate, wherein the first active material on the first surface has a thickness equal to a thickness of the first active material on the second surface, and wherein the ceramic material on the first or second surface comprises a thickness that is about 30 μm to about half a difference between a thickness of the first plate and a thickness of the substrate.

According to an embodiment, the ceramic material on the first or second surface comprises a thickness that is about 30 μm to a thickness of the first active material on the first or second surface.

The ceramic material may comprise at least one of $Al_2O_3$, $BaTiO_4$, $TiO_2$ and $SiO_2$.

The ceramic material may comprise two materials of $Al_2O_3$, $BaTiO_4$, $TiO_2$ and $SiO_2$ in the weight ratio from 7:3, with seven parts of $Al_2O_3$ or $TiO_2$ and three parts of $BaTiO_4$ or $SiO_2$, to 1:1.

BRIEF DESCRIPTION OF THE DRAWINGS

The accompanying drawings, together with the specification, illustrate embodiments of the present invention, and, together with the description, serve to explain the principles of the present invention.

DETAILED DESCRIPTION

Figure 1:
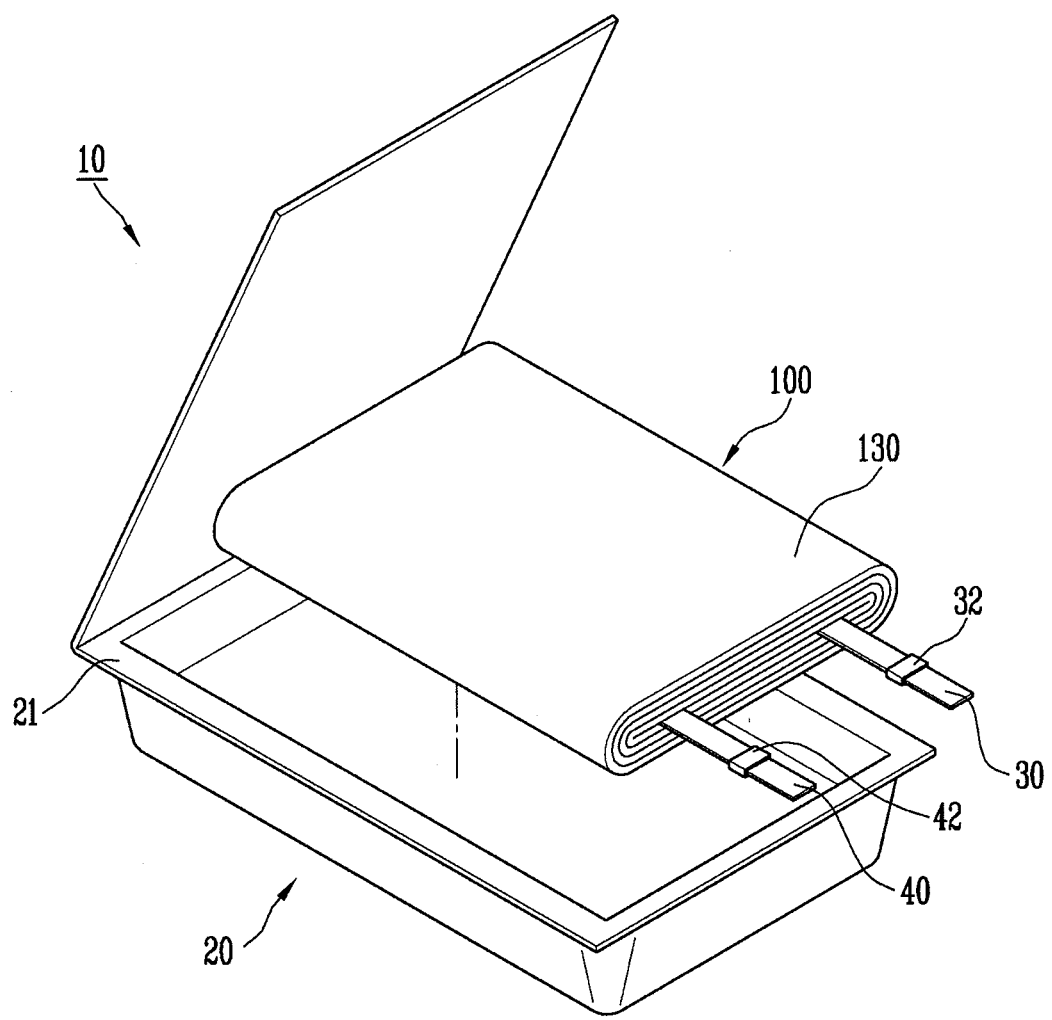
FIG. 1 is an exploded perspective view of a secondary battery according to one embodiment of the present invention.

Reference will now be made in detail to certain embodiments of the present invention, examples of which are illustrated in the accompanying drawings. The embodiments are described below in order to explain the present invention by referring to the figures. This invention may, however, be embodied in many different forms and should not be construed as limited to the particular embodiments set forth herein. Rather, these embodiments are provided so that this disclosure will be thorough and complete, and will fully convey the scope of the invention to those skilled in the art. It will be understood that when an element or layer is referred to as being "on" or "connected to" another element or layer, the element or layer can be directly on the other element or layer, or the element or layer may be electrically connected to the other element or layer with intervening elements or layers being present. Also, description of certain parts or elements may not be provided for clarity and conciseness, and like reference numerals refer generally to like elements throughout.

Hereinafter, embodiments of the present invention will be described in detail with reference to the accompanying drawings.

Figure 2:
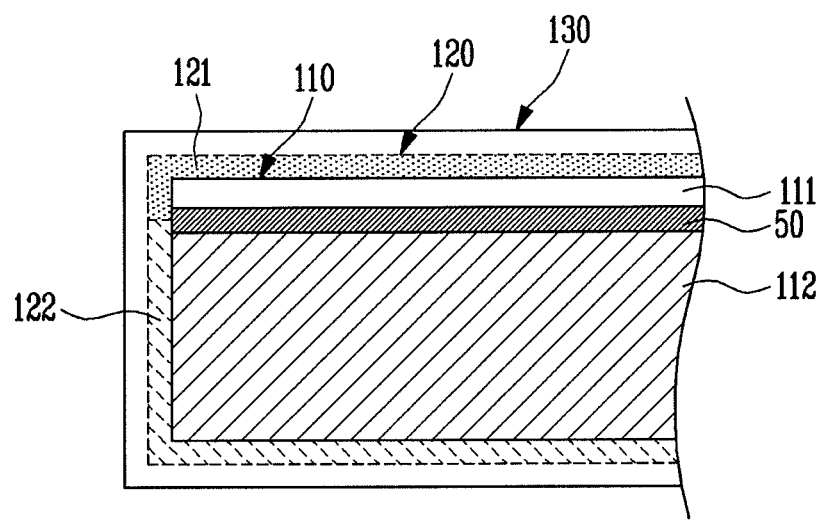
FIG. 2 illustrates a first plate, a second plate, and a separator disposed between the plates which constitute an electrode assembly of FIG. 1.
Figure 3:
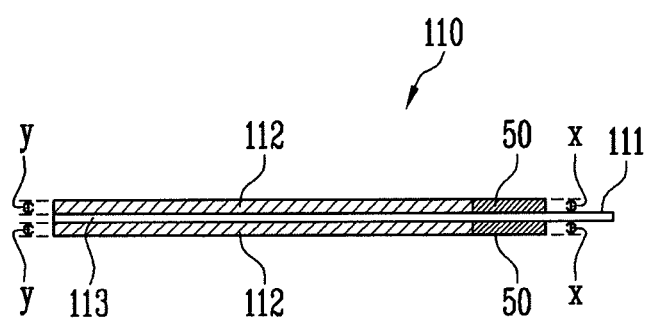
FIG. 3 is a side view of the positive plate according to the embodiment.

FIGS. 1 to 3 illustrate one embodiment of the present invention.

FIG. 1 is an exploded perspective view of a secondary battery according to an embodiment of the present invention, and FIG. 2 illustrates a first plate, a second plate, and a separator disposed between the plates which constitute an electrode assembly of FIG. 1.

The secondary battery 10 according to the illustrated embodiment includes an electrode assembly having a first plate 110 including a first active part 112 and a first non-active part 111, the active part 112 being formed by coating a substrate with an active material; a second plate 120 disposed on the first plate 110 and including a second active part 122 and a second non-active part 121, the second active part 122 being formed by coating a substrate with an active material; and a separator 130 disposed between the first plate 110 and the second plate 120, wherein the first non-active part 111 includes a ceramic layer 50 in a position corresponding to second active part 122 when the first plate 110 and the second plate 120 are stacked.

The first non-active part 111 and the second non-active part 121 may be portions of the first plate 110 and the second plate 120 that are not coated with active materials, respectively, and may extend from the active parts 112 and 122.

Referring to FIG. 1, the secondary battery 10 according to the present embodiment may be manufactured by accommodating the electrode assembly 100 and an electrolyte (not shown) in a battery case 20.

The battery case 20 may include a body part accommodating the electrode assembly 100 and a cover covering the body part. A sealing part 21 may be formed on an edge of the body part. The secondary battery 10 may be manufactured by accommodating the electrode assembly 100 and the electrolyte in the body part of the battery case 20, and then thermally fusing the sealing part 21 while closely attaching the cover to the body part.

Here, the first non-active part 111 and the second non-active part 112 of the electrode assembly 100 may be formed with a first electrode tab 30 and a second electrode tab 40, respectively. The first electrode tab 30 and the second electrode tab 40 may be exposed to an exterior of the battery case 20 through the sealing part 21. The first electrode tab 30 and the second electrode tab 40 may include lead films 32 and 42, respectively. The lead films 32 and 42 may be formed on a portion where the first electrode tab 30 and the second electrode tab 40 are in contact with the sealing part 21. The lead films 32 and 42 can inhibit short circuits that may occur when the first electrode tab 30 and the second electrode tab 40 are thermally fused with the sealing part 21. Also, the lead films 32 and 42 can improve the adhesive strength between the electrode tabs 30 and 40 and the sealing part 21 to prevent leakage of the electrolyte.

The electrolyte can include lithium salts and a non-aqueous organic solvent, wherein the lithium salts function as a supply of lithium ions, and the non-aqueous organic solvent serves as a medium to enable ions involved in an electrochemical reaction to transfer.

Referring to FIG. 1, the electrode assembly 100 according to the present embodiment may be formed by winding the first plate 110, the second plate 120, and the separator 130 disposed between the plates.

FIG. 2 illustrates the electrode assembly 100 of FIG. 1 not wound, in which the separator 130, the second plate 120, the separator 130, and the first plate 110 are sequentially stacked. Here, the first plate 110 and the second plate 120 may be stacked in different order. The stacked first and second plates 110 and 120 and the separator 130 interposed between the plates may be wound into the electrode assembly 100 of the present embodiment.

The first plate 110 may be a positive plate. The positive plate may include a positive active part 112 formed by coating a substrate with a positive active material and a non-active part 111 not coated with the positive active material. Generally, the substrate may be any material which has high conductivity and does not cause chemical changes. The positive active material forming the positive active part 112 may include a layered compound including lithium.

The second plate 120 may be a negative plate. The negative plate can include a negative active part 122 formed by coating a substrate with a negative active material and a non-active part 121 not coated with the negative active material. The substrate may be a conductive metal, and the negative active material forming the negative active part 122 may include graphite. Hereinafter, for convenience, the first plate 110 is referred to as the positive plate and the second plate 120 is referred to as the negative plate, without being limited.

The separator 130 may be disposed between the positive plate 110 and the negative plate 120 to inhibit short circuits that may occur as a result of contact between the plates 110 and 120. Generally, the separator 130 is an insulating thin film having high ion permeability and high mechanical strength.

When the secondary battery 10 is exposed to high temperature, the separator 130 can contract, so that the active parts 112 and 122 of the positive plate 110 and the negative plate 120 can become exposed. Further, when a plurality of positive plates 10 and a plurality of negative plates 120 are stacked, the plates may not be properly aligned. In this case, when plates having different polarities directly contact each other, a short circuit may occur. In particular, the non-active part 111 of the positive plate 110 corresponding to the negative plate 120 may be vulnerable to a short circuit. To prevent this short circuit, the ceramic layer 50 may be further formed on either surface of the first non-active part 111 adjacent to the active part 112 of the positive plate 110.

Generally, a portion of the first non-active part 111 adjacent to the positive active part 112 may be disposed to face the negative active part 122 with the separator 130 disposed therebetween. In this case, when the separator 130 disposed between the plates is contracted or detached, the positive plate 110 and the negative plate 120 can contact each other to cause a short circuit. Thus, the first non-active part 111 may include the ceramic layer 50 in a position corresponding to the negative active part 122 when positive plate 110 and negative plate 120 are stacked.

FIG. 3 is a side view of the positive plate 110 according to the present embodiment.

Referring to FIG. 3, the positive plate 110 includes the positive active part 112 formed by coating upper and lower surfaces of the substrate 113 with the positive active material. Further, the positive plate 110 includes the first active part 111 having the ceramic layer 50, and the ceramic layer 50 on the first non-active part 111 may be formed on both upper and lower surfaces of the first non-active part 111.

Further, the ceramic layer 50 may be formed along a boundary surface between the positive active part 112 of the positive plate 110 and the first non-active part 111. The first non-active part 111 may include the first electrode tab 30 (See FIG. 1) to be exposed from the first non-active part 111 to the outside.

When the positive active part 112 formed on the upper surface of the substrate 113 and the positive active part 112 formed on the lower surface thereof have the same thickness, the thickness (x) of the ceramic layer 50 on the first non-active part 111 may be 0.5 times the difference between the total thickness of the positive plate 110 and the thickness of the substrate 113. Generally, the thickness (x) of the ceramic layer 50 may be from 30 μm to the thickness (y) of the positive active part 112 formed on the same surface of the substrate 113.

In a case in which the thickness (x) of the ceramic layer 50 is less than 30 μm, the ceramic layer 50 will not have sufficient properties to stably prevent a short circuit between the positive plate 110 and the negative plate 120, and it would be difficult to form the thickness uniformly, resulting in an increase in processing costs. In a case in which the thickness (x) of the ceramic layer 50 is greater than the thickness (y) of the positive active part 112, when the positive plate 110, the negative plate 120, and the interposed separator 130 are stacked and wound, a part in which the ceramic 130 is disposed has a relatively greater thickness. Accordingly, the plates are not properly aligned when winding. Further, as the plates are wound, the thickness of the ceramic layer 50 increases, which may disrupt sealing of the battery case 20. Accordingly, the electrolyte may leak. Thus, the thickness (x) of the ceramic layer 50 may be from 30 μm to the thickness (y) of the positive active part 112 formed on the same surface of the substrate 113.

In the present embodiment, the thickness (y) of the positive active part 112 formed on the upper surface of the substrate 113 is the same as the thickness (y) of the positive active part 112 formed on the lower surface, but they may be different in other embodiments. When the thickness (y) of the positive active part 112 is different on position, the thickness (x) of the ceramic layer 50 may be determined based on the thickness (y) of the positive active part 112 formed on the same surface of the substrate 113.

The ceramic layer 50 may include, for example, at least one of $Al_2O_3$, $BaTiO_4$, $TiO_2$, and $SiO_2$. Here, the ceramic layer 50 may include a mixture of two materials among $Al_2O_3$, $BaTiO_4$, $TiO_2$, and $SiO_2$ at 7:3 or 5:5.

Figure 4:
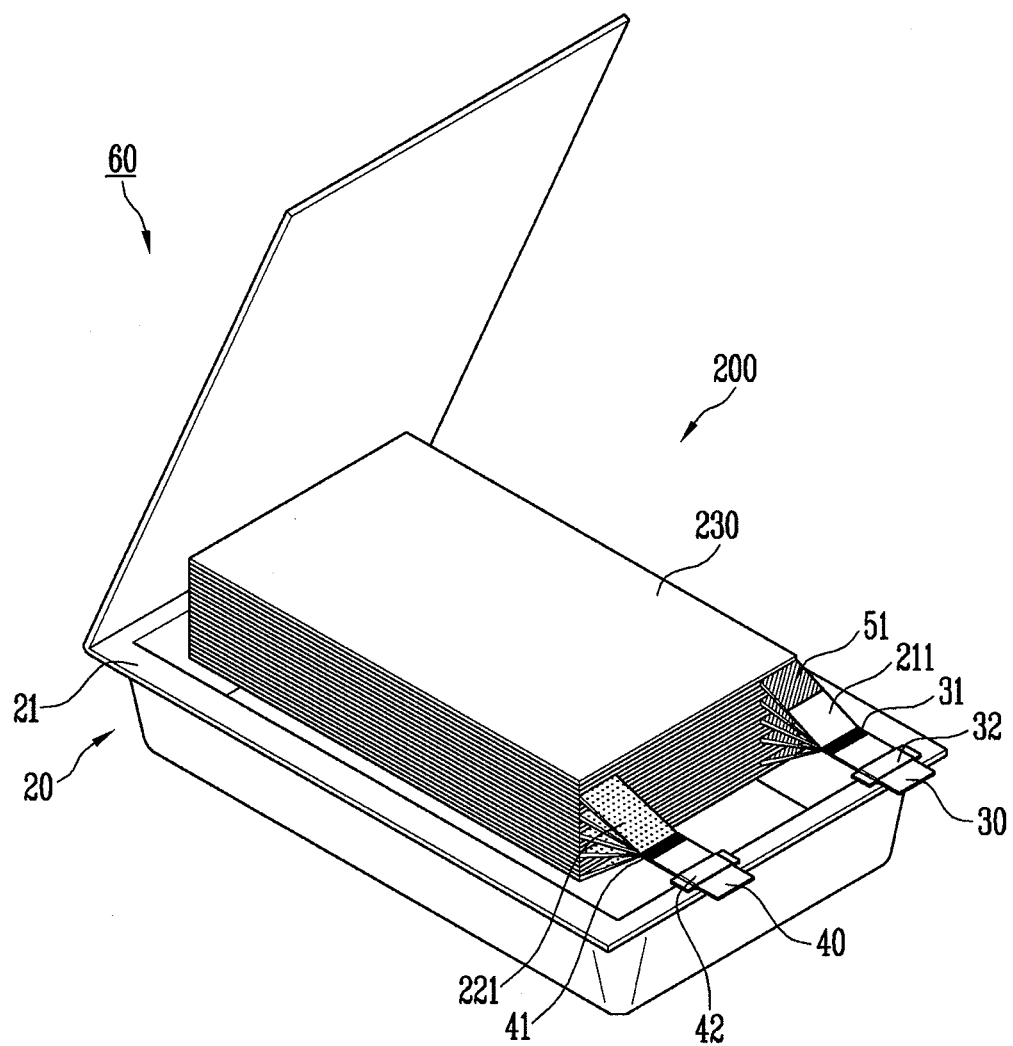
FIG. 4 is an exploded perspective view of a secondary battery according to another embodiment of the present invention.
Figure 5:
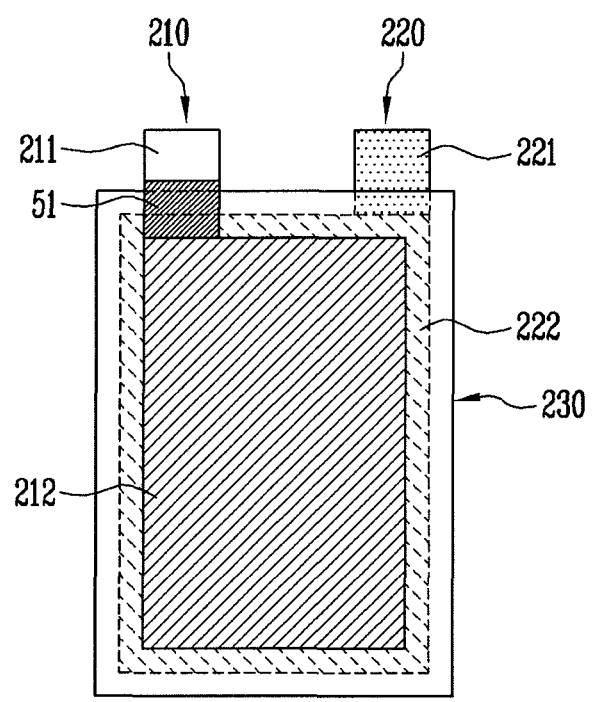
FIG. 5 illustrates a first plate, a second plate, and a separator disposed between the plates which constitute an electrode assembly of FIG. 4.

FIGS. 4 and 5 illustrate another embodiment of the present invention.

In the following description, details similar to those explained with reference to FIGS. 1 to 3 will not be provided.

FIG. 4 is an exploded perspective view of a secondary battery according to another embodiment of the present invention; and FIG. 5 illustrates a first plate, a second plate, and a separator disposed between the plates that constitute the electrode assembly of FIG. 4.

The secondary battery 60 according to the present embodiment includes an electrode assembly 200 having a positive plate 210 including an active part 212 and a first non-active part 211, the active part 212 being formed by coating a substrate with an active material; a negative plate 220 disposed on the positive plate 210 and including an active part 222 and a second non-active part 221, the second active part 222 being formed by coating a substrate with an active material; and a separator 230 disposed between the positive plate 210 and the negative plate 220, wherein the first non-active part 211 includes a ceramic layer 51 in a corresponding position to the negative plate 220.

The first non-active part 211 and the second non-active part 221 may be portions of the positive plate 210 and the negative plate 220 that are not coated with active materials, respectively, and may extend from the active parts 212 and 222.

Here, the first non-active part 211 and the second non-active part 221 of the electrode assembly 200 may be formed to extend in a rectangular shape from the active material coated parts 212 and 222 of the positive plate and the negative plate 210 and 220 by punching using a mold. The punched first and second non-active parts 211 and 221 may be fused with first and second electrode tabs 30 and 40 having lead films 32 and 42 to form fused parts 31 and 41. For example, the first non-active part 211 and the second non-active part 221 may function as a first tab and a second tab of the positive plate 210 and the negative plate 220.

Referring to FIG. 4, the electrode assembly 200 of the present invention includes a plurality of positive plates 210 and a plurality of negative plates 220, which are stacked with the separator 230 being disposed between the plates.

FIG. 5 illustrates a unit constituting the electrode assembly 200 of FIG. 4, and the electrode assembly 200 of the present invention is manufactured by stacking a plurality of units. In detail, each unit includes one negative plate 220, a positive plate 210 stacked over the negative plate 220, and a separator 230 interposed between the plates. Negative plates 220 and positive plates 210 are alternately stacked with a separator 230 interposed therebetween, thereby forming the secondary battery 60 according to the present embodiment. Here, the plates may be stacked in different order.

In this stacked structure, the first non-active part 211 is a portion corresponding to the negative plate 220 and may be vulnerable to a short circuit. To inhibit a short circuit, the first non-active part 211 corresponding to the negative plate 220 may include the ceramic layer 51. Here, a portion of the first non-active part 211 adjacent to the positive active part 212 may be disposed to face the negative active part 222, with the separator 230 disposed therebetween, and thus be the most vulnerable to a short circuit. Thus, the ceramic layer 51 on the first non-active part 211 may be formed adjacently to the positive active part 212.

The ceramic layer 51 may have a different polarity from the negative plate 220 and may be formed to cover a front part of the non-active part 211, which is highly likely to come in contact with the negative plate 220, in order to inhibit a short circuit with the negative plate 220. Further, a plurality of first non-active parts 211 formed by stacking positive plates 210 may include a fused part 31, which is connected with the first electrode tab 30 through welding. The fused part 31 may be formed by laser welding or resistance welding. When the ceramic layer 51 is disposed on the fused part 31, it may become damaged while the first non-active part 211 and the first electrode tab 30 are welded. Alternatively, the ceramic layer 51 may disturb fusion of the first non-active part 211 and the first electrode tab 30. Thus, the ceramic layer 51 may be formed to cover the front part of the first non-active part 211 except for the fused part 31 of the first non-active part 211.

As described above, embodiments of the present invention provide a secondary battery that inhibits a positive plate and a negative plate from short-circuiting to improve safety.

Further, there is provided a secondary battery which is stably used at high temperature without having ignition problems.

In addition, there is provided a secondary battery in which a positive plate and a negative plate are easily aligned to improve productivity.

While the present invention has been described in connection with certain embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A secondary battery comprising:
   an electrode assembly comprising a first plate, a second plate, and a separator disposed between the first and second plates,
      wherein the first plate comprises an active portion and a non-active portion extending from the active portion,
      wherein the second plate comprises an active portion and a non-active portion extending from the active portion;
   a ceramic material disposed on the non-active portion of the first plate in a position corresponding to the active portion of the second plate when the first plate and the second plate are stacked, and wherein the ceramic material is further disposed adjacent to an interface between the active portion and the non-active portion of the first plate; and a battery case housing the electrode assembly.

2. The secondary battery of claim 1, wherein the ceramic material comprises at least one of $Al_2O_3$, $BaTiO_4$, $TiO_2$ and $SiO_2$.

3. The secondary battery of claim 1, wherein the ceramic material comprises two materials of Al2O3, BaTiO4, TiO2 and SiO2 in the weight ratio from 7:3, with seven parts of Al2O3 or TiO2 and three parts of BaTiO4 or SiO2, to 1:1.

4. The secondary battery of claim 1, wherein the first plate is a positive plate, wherein the active portion of the first plate comprises a positive active material coated on a first substrate, wherein the second plate is a negative plate, and wherein the active portion of the second plate comprises a negative active material coated on a second substrate.

5. The secondary battery of claim 1, wherein the first plate, the second plate and the separator in the electrode assembly are wound.

6. The secondary battery of claim 5, wherein the first plate is formed by coating a first active material on at least one of a first surface of a substrate and on an opposing second surface of the substrate, wherein the active portion of the first plate is defined by a portion of the substrate that is coated and the non-active portion of the first plate is defined by a portion of the substrate that is not coated, and wherein the ceramic material is formed on at least one of the first and second surfaces of the substrate at the non-active portion.

7. The secondary battery of claim 6, wherein the first plate is formed by coating a first active material on the first and second surfaces of the first substrate, wherein the first active material on the first surface has a thickness equal to a thickness of the first active material on the second surface, and wherein the ceramic material on the first or second surface comprises a thickness that is about 30 μm to about half a difference between a thickness of the first plate and a thickness of the substrate.

8. The secondary battery of claim 6, wherein the ceramic material on the first or second surface comprises a thickness that is about 30 μm to a thickness of the first active material on the first or second surface.

9. The secondary battery of claim 1, wherein the first plate and the second plate are alternately stacked with a separator disposed between the first and second plates.

10. The secondary battery of claim 9, wherein the ceramic material is disposed on at least one of a first surface or an opposing second surface of the non-active portion of the first plate.

11. The secondary battery of claim 9, further comprising a plurality of first plates and second plates alternately stacked with a separator disposed between adjacent plates, a plurality of non-active portions on the first plates, a plurality of non-active portions on the second plates, and a plurality of ceramic layers disposed on the non-active portions of the first plates.

12. The secondary battery of claim 11, wherein the non-active portions of the first plates are welded to a first electrode tab at a first welded portion, wherein the non-active portions of the second plates are welded to a second electrode tab at a second welded portion, and wherein the ceramic layers are formed at a first end of the non-active portions of the first plates and the welded portion is formed at a second opposing end of the non-active portions of the first plates.

13. A secondary battery comprising:
an electrode assembly comprising a first plate, a second plate, and a separator disposed between the first and second plates,
wherein the first plate comprises an active portion and a non-active portion extending from the active portion,
wherein the second plate comprises an active portion and a non-active portion extending from the active portion; and
a ceramic material disposed on the first plate at a location where the ceramic material may provide insulation between the first and second plates to thereby inhibit short circuits between the first and second plates, wherein the ceramic material is in a position corresponding to the active portion of the second plate when the first plate and the second plate are stacked, and wherein the ceramic material is further disposed adjacent to an interface between the active portion and the non-active portion of the first plate.

14. The secondary battery of claim 13, wherein the ceramic material is positioned so that short circuits are inhibited when the separator shrinks due to heat.

* * * * *